(12) United States Patent
R et al.

(10) Patent No.: US 11,582,158 B2
(45) Date of Patent: *Feb. 14, 2023

(54) SYSTEM AND METHODS TO FILTER OUT NOISY APPLICATION SIGNATURES TO IMPROVE PRECISION OF FIRST PACKET CLASSIFICATION

(71) Applicant: Citrix Systems, Inc., Fort Lauderdale, FL (US)

(72) Inventors: Siddharth G R, Bengaluru (IN); Tarun Kumar Hukmichand, Bengaluru (IN)

(*) Notice: Subject to any disclaimer, the term of this patent is extended or adjusted under 35 U.S.C. 154(b) by 4 days.

This patent is subject to a terminal disclaimer.

(21) Appl. No.: 17/157,640

(22) Filed: Jan. 25, 2021

(65) Prior Publication Data

US 2021/0152481 A1 May 20, 2021

Related U.S. Application Data

(63) Continuation of application No. 16/210,706, filed on Dec. 5, 2018, now Pat. No. 10,911,362.

(51) Int. Cl.
| | |
|---|---|
| *H04L 47/2441* | (2022.01) |
| *H04L 47/2483* | (2022.01) |
| *H04L 45/00* | (2022.01) |
| *H04L 47/625* | (2022.01) |
| *H04L 45/745* | (2022.01) |
| *H04L 47/80* | (2022.01) |
| *H04L 67/02* | (2022.01) |
| *H04L 65/612* | (2022.01) |

(52) U.S. Cl.
CPC ......... *H04L 47/2441* (2013.01); *H04L 45/34* (2013.01); *H04L 45/745* (2013.01); *H04L 47/2483* (2013.01); *H04L 47/627* (2013.01); *H04L 47/805* (2013.01); *H04L 65/612* (2022.05); *H04L 67/02* (2013.01)

(58) Field of Classification Search
None
See application file for complete search history.

(56) References Cited

U.S. PATENT DOCUMENTS

| | | | | |
|---|---|---|---|---|
| 7,127,713 | B2* | 10/2006 | Davis | H04L 67/1008 717/177 |
| 7,680,897 | B1* | 3/2010 | Carter | H04L 47/808 709/219 |
| 7,756,913 | B1* | 7/2010 | Day | H04L 67/306 709/225 |

(Continued)

OTHER PUBLICATIONS

Non-Final Office Action on U.S. Appl. No. 16/210,706 dated Apr. 15, 2020.

(Continued)

*Primary Examiner* — Lashonda Jacobs-Burton

(57) ABSTRACT

The systems and methods discussed herein provide for classifying CDN connections to the originating application on the first packet. In some implementations, the system identifies application connections established within a predetermined time period prior to the CDN connection and increments a value associated with these connections. The system classifies the CDN connection as corresponding to the application connection with the highest associated value, allowing routing of network traffic to take advantage of QoS benefits and reduce the need for deep packet inspection.

20 Claims, 4 Drawing Sheets

(56) References Cited

U.S. PATENT DOCUMENTS

| | | | | |
|---|---|---|---|---|
| 7,903,657 B2* | 3/2011 | Nakamura | H04L 63/1425 | 370/252 |
| 8,051,166 B1* | 11/2011 | Baumback | H04L 43/00 | 709/224 |
| 8,140,701 B2* | 3/2012 | Rajan | H04L 67/59 | 709/231 |
| 9,253,068 B1* | 2/2016 | Wu | H04L 63/166 | |
| 9,485,183 B2* | 11/2016 | Anand | H04L 45/7453 | |
| 9,549,043 B1* | 1/2017 | Stoica | H04L 65/612 | |
| 9,608,916 B2* | 3/2017 | Muppala | H04L 47/2441 | |
| 2008/0291923 A1* | 11/2008 | Back | H04L 45/04 | 370/396 |
| 2010/0313257 A1* | 12/2010 | Padinjareveetil | H04N 21/2541 | 726/8 |
| 2013/0080623 A1* | 3/2013 | Thireault | H04L 41/40 | 709/224 |
| 2017/0237710 A1* | 8/2017 | Mayya | H04L 49/35 | 726/13 |
| 2017/0244643 A1* | 8/2017 | Lawrence | H04L 67/10 | |
| 2017/0288987 A1* | 10/2017 | Pasu | H04L 63/0227 | |
| 2018/0131620 A1* | 5/2018 | Su | H04L 47/2441 | |
| 2018/0191832 A1* | 7/2018 | Gero | H04L 67/104 | |
| 2018/0198694 A1* | 7/2018 | Wells | H04L 67/1021 | |
| 2018/0227223 A1* | 8/2018 | Hughes | H04L 69/22 | |

OTHER PUBLICATIONS

Notice of Allowance on U.S. Appl. No. 16/210,706 dated Oct. 7, 2020.

* cited by examiner

SYSTEM AND METHODS TO FILTER OUT NOISY APPLICATION SIGNATURES TO IMPROVE PRECISION OF FIRST PACKET CLASSIFICATION

CROSS-REFERENCE TO RELATED APPLICATION

This patent application is a continuation of, and claims priority to and the benefit of, U.S. patent application Ser. No. 16/210,706, titled "System And Methods To Filter Out Noisy Application Signatures To Improve Precision Of First Packet Classification," filed Dec. 5, 2018 and issued as U.S. Pat. No. 10,911,362 on Feb. 2, 2021, the contents of all of which are hereby incorporated herein by reference in its entirety for all purposes.

FIELD OF THE DISCLOSURE

The present application generally relates to first packet classification for application routing.

BACKGROUND OF THE DISCLOSURE

Classifying a connection on the first packet is important to accomplish certain networking functions, including routing applications, optimizing bandwidth usage, improving application performance, and using application firewalls. Application-based routing on content delivery network (CDN) connections require deep packet inspection, which takes significant time and processing resources in addition to adding latency to the network, to take advantage of quality of service (QoS) benefits in traffic prioritization and processing.

BRIEF SUMMARY OF THE DISCLOSURE

The system and methods discussed herein provide for classifying CDN connections to the originating application on the first packet. In some implementations, the system identifies application connections established within a predetermined time period prior to the CDN connection and increments a value associated with these connections. The system classifies the CDN connection as corresponding to the application connection with the highest associated value, allowing routing of network traffic to take advantage of QoS benefits and reduce the need for deep packet inspection.

In one aspect, the present disclosure is directed to a method for application classification of an initial packet for a content delivery network connection. The method includes receiving, by a device, an initial packet for a new CDN connection to a first destination address. For each of a plurality of connections to the first destination address from a plurality of different source addresses, the method includes identifying, by the device, an additional connection established within a predetermined time period prior to the connection to the first destination address, the additional connection associated with an application of a plurality of applications, and incrementing a value associated with the application of the plurality of applications. The method also includes classifying, by the device, the new CDN connection as corresponding to a first application having a highest value of the values associated with the plurality of applications.

In some implementations, the method includes classifying the new CDN connection as corresponding to the first application further comprises determining that the value associated with the first application exceeds a predetermined threshold. In some implementations, the method includes identifying each additional connection and incrementing a corresponding value is performed when the additional connection is established.

In some implementations, the method includes receiving, by the device, an initial packet for a second new CDN connection to the first destination address. The method also includes determining, by the device, that no value of the values associated with the plurality of applications is above a threshold. The method also includes classifying, by the device, the second CDN connection as associated with an application based on deep packet inspection of the initial packet for the second CDN connection.

In some implementations, the method includes decrementing a value associated with a second application of the plurality of applications, by the device, responsive to identifying no additional connections established within the predetermined time period associated with the second application. In some implementations, the plurality of applications are identified in a candidate list; and further comprising removing the second application from the candidate list, responsive to the second counter being less than a threshold.

In some implementations, the method includes transmitting, by the device to a second device, an identification of the first destination address and the first application, the second device classifying one or more additional CDN connections directed to the first destination address as associated with the first application. In some implementations, the method includes processing packets of the CDN connection according to a policy associated with the first application.

In another aspect, the present disclosure is directed to a system for associating related connections of an application to different endpoints. The system includes a device comprising a network interface, and a processor. The processor is configured to receive, via the network interface, an initial packet for a new content delivery network (CDN) connection to a first destination address; for each of a plurality of connections to the first destination address from a plurality of different source addresses, identify an additional connection established within a predetermined time period prior to the connection to the first destination address, the additional connection associated with an application of a plurality of applications; increment a value associated with the application of the plurality of applications, and classify the new CDN connection as corresponding to a first application having a highest value of the values associated with the plurality of applications.

In some implementations, the processor is further configured to determine that the value associated with the first application exceeds a predetermined threshold. In some implementations, the system includes identifying each additional connection and incrementing a corresponding value when the additional connection is established.

In some implementations, the processor is further configured to receive an initial packet for a second new CDN connection to the first destination address; determine that no value of the values associated with the plurality of applications is above a threshold; and responsive to the determination, classify the second CDN connection as associated with an application based on deep packet inspection of the initial packet for the second CDN connection.

In some implementations, the processor is further configured to decrement a value associated with a second application of the plurality of applications, by the device, responsive to identifying no additional connections established within the predetermined time period associated with the second application. In some implementations, the plurality of applications are identified in a candidate list; and the processor is further configured to remove the second application from the candidate list, responsive to the second counter being less than a threshold.

In some implementations, the processor is further configured to transmit, to a second device, an identification of the first destination address and the first application, the second device classifying one or more additional CDN connections directed to the first destination address as associated with the first application. In some implementations, the processor is further configured to process packets of the CDN connection according to a policy associated with the first application.

In another aspect, the present disclosure is directed to a non-transitory computer-readable medium comprising instructions that, when executed by a processor of a device, cause the device to receive an initial packet for a new content delivery network (CDN) connection to a first destination address. For each of a plurality of connections to the first destination address from a plurality of different source addresses, the computer-readable medium also causes the device to identify an additional connection established within a predetermined time period prior to the connection to the first destination address, the additional connection associated with an application of a plurality of applications, and increment a value associated with the application of the plurality of applications. The computer-readable medium also causes the device to classify the new CDN connection as corresponding to a first application having a highest value of the values associated with the plurality of applications.

In some implementations, the instructions further comprise instructions that, when executed by the processor, cause the device to determine that the value associated with the first application exceeds a predetermined threshold. In some implementations, the instructions further comprise instructions that, when executed by the processor, cause the device to receive an initial packet for a second new CDN connection to the first destination address; determine that no value of the values associated with the plurality of applications is above a threshold; and responsive to the determination, classify the second CDN connection as associated with an application based on deep packet inspection of the initial packet for the second CDN connection.

In some implementations the computer-readable medium includes instructions that, when executed by the processor, cause the device to decrement a value associated with a second application of the plurality of applications, by the device, responsive to identifying no additional connections established within the predetermined time period associated with the second application.

The details of various embodiments are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
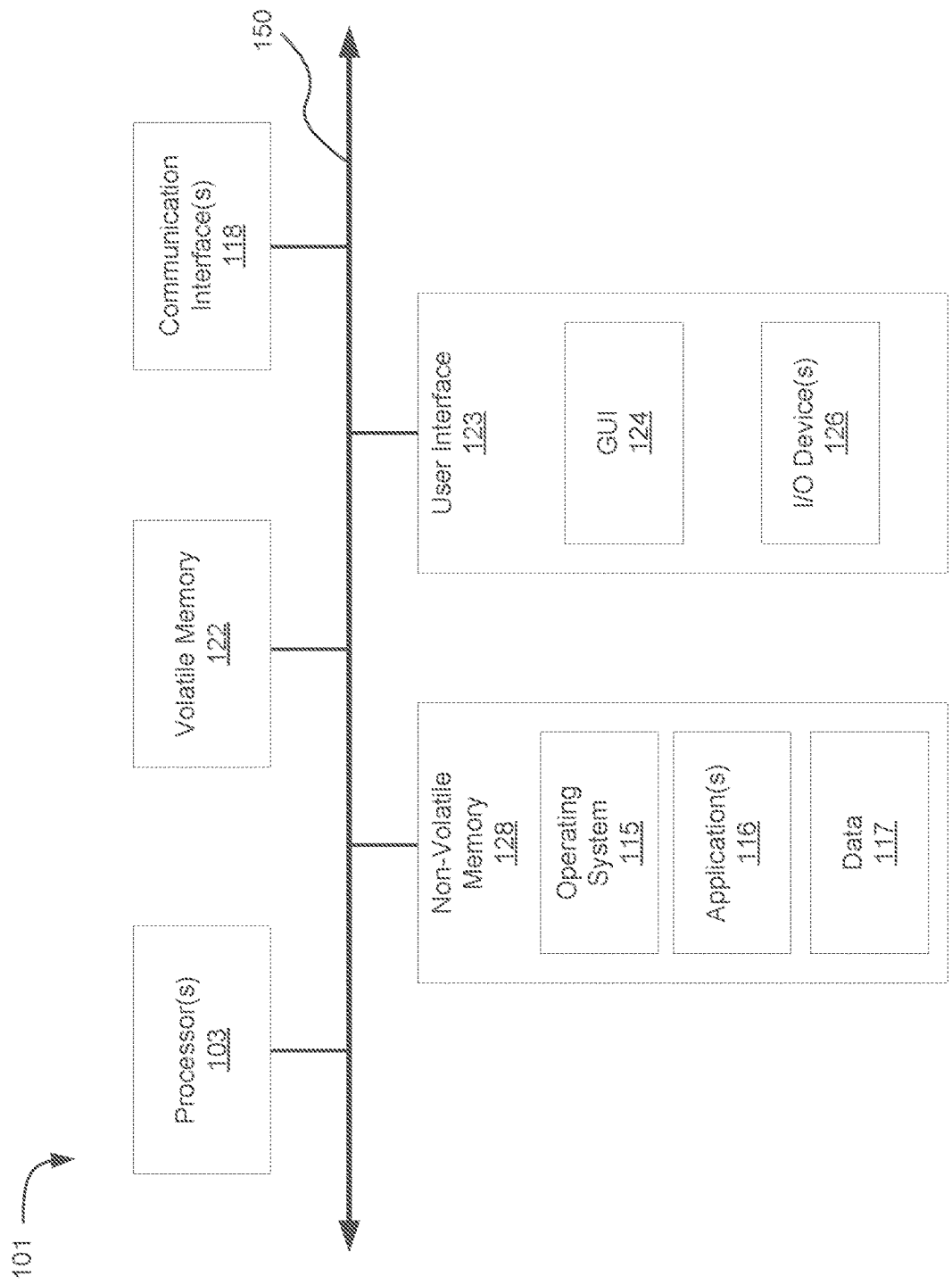
FIG. 1 is a block diagram illustrating an implementation of a network environment for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for CDN connection classification to the originating application on the first packet.

A. Computing Environment

Prior to discussing the specifics of embodiments of the systems and methods for CDN connection classification to the originating application on the first packet, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for CDN Connection Classification to the Originating Application on the First Packet Classifying a connection on the first packet is important for a variety of reasons, including to accomplish certain networking functions. These networking functions may include application routing, optimizing bandwidth usage, improving application performance, and using application firewalls. For an unknown connection, classification typically occurs using a deep packet inspection of similar connections, namely those with the same destination internet protocol (IP) and port, that have been observed. By observing application signatures for an unknown connection, classification can occur on the first packet. The application signatures may include data patterns, secure sockets layer (SSL) certificates, and uniform resource locators (URLs).

Application-based routing on CDN connections encounter an issue when a deep packet inspection of the first packet is performed. The resulting information may reveal the vendor associated with the CDN, but it does not reveal the application that prompted the request for a resource from that CDN. For example, in some implementations, an application may obtain resources from a separate server or data storage facility. A plausible policy for routing internet traffic would be to route all traffic from the application through link A and any other traffic not coming from the application through link B. Performing a first packet classification on traffic from the application would result in future traffic coming directly from the application through link A. However, the resources that the application requests may not be classified as coming from the application if, for example, the resources are stored on a local server facility or downloaded directly from a CDN. As a result, these resources would be routed through link B, leading to a sub-optimal routing of internet traffic.

Figure 2:
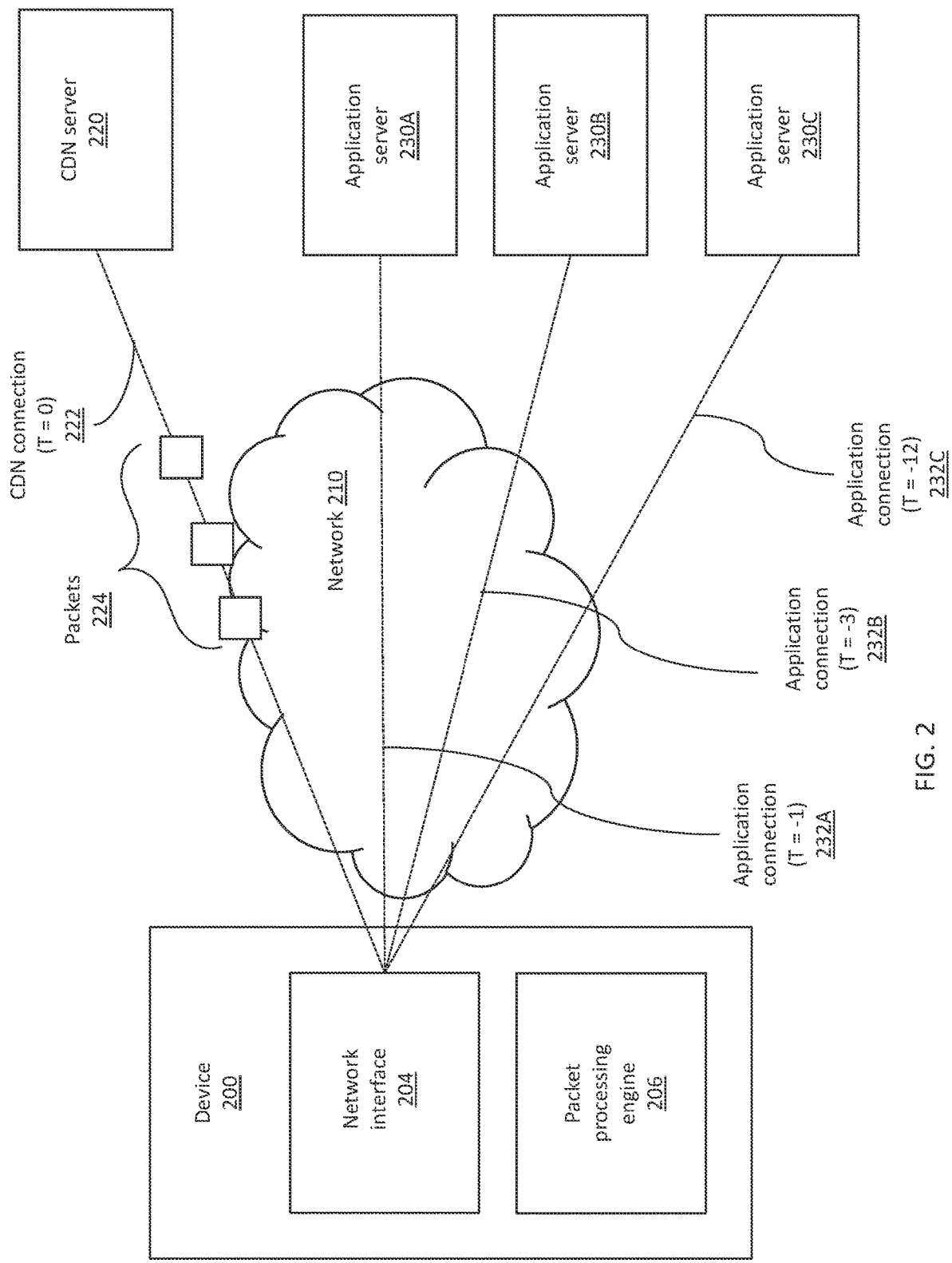
FIG. 2 is a block diagram illustrating an implementation of a system for classifying a CDN connection using connections established within a predetermined time period.

FIG. 2 is a block diagram of a network environment with a CDN connection 222 established from a device 200 to a CDN server 220 via a network 210. Although shown as the endpoint of the connection, in many implementations, device 200 maybe be an intermediary device, and the CDN connections may be retransmitted by a device 200 to further end points (e.g. servers, client devices, etc.). Device 200 may comprise any type and form of computing devices, including laptop computers, desktop computers, tablet computers, wearable computers, smart phones, smart televisions, video game consoles, workstations, servers, blade servers, smart appliances (e.g. Internet-of-Things (IoT) devices), network appliances, (e.g. routers, switches, firewalls, network accelerators, proxies, access points, modems, gateways, etc.), physical computing devices, virtual computing devices executed by one or more physical computing devices, server clouds, server farms, server clusters, appliance clusters, or any other type and form of computing device or devices. Network 210 may comprise any type and form of network or combination of networks, including cellular networks, WiFi networks, broadband networks, telephone networks, microwave networks, fiber optic networks, satellite networks, etc. Network 210 may comprise a local area network (LAN), metropolitan area network (MAN), wide area network (WAN) such as the Internet, virtual private network (VPN), mesh or peer-to-peer network, or any other type and form of network or combinations of networks. In many implementations, network 210 may comprise one or more additional devices not illustrated, such as gateways, switches, routers, load balancers, etc.

CDN connection 222 may comprise a communication flow between a CDN server 220 and the device 200, or between a CDN server 220 and another device (not illustrated) with communications traversing the device 200 as an intermediary. For example, a connection may comprise communications between a web browser and web server, an online video game and database server, a media player and a streaming media server, video or voice-over-IP endpoints, a mail application and mail server, or any other type and form of communications flow. CDN connections may utilize different protocols, such as application layer protocols such as the file transfer protocol (FTP) or the hypertext transfer protocol (HTTP), presentation layer protocols such as the independent computing architecture protocol (ICA), session layer protocols such as the real-time transport protocol (RTP), transport layer protocols such as the transport control protocol (TCP) or user datagram protocol (UDP), internet layer protocols such as various varieties of the internet protocol (IPv4 or IPv6), or any other protocols or combinations of protocols. A CDN connection is a type of flow, which is referred to as a packet flow, traffic flow, network flow, or communication flow. A flow may comprise a sequence of packets 224 between a source and destination, and may include unidirectional or bidirectional traffic (e.g. requests and responses). In implementations in which device 200 is an intermediary for a communication flow, the flow may be defined or identified via endpoint-to-endpoint communications at higher layers of the network stack (e.g. above the network layer).

Device 200 may include a network interface 204, such as interfaces(s) 118 discussed above. Additionally, device 200 may include a packet processing engine 206. Packet processing engine 206 may comprise an application, service, server, daemon, routine, or other executable logic for monitoring, identifying, analyzing, processing, and/or transmitting packets via a network interface. In some implementations, packet processing engine 206 may comprise hardware, such as an ASIC or FPGA or co-processor, while in other implementations, packet processing engine 206 may comprise software executed by a processor or co-processor of device 200, such as drivers of a network stack of an operating system of a device.

When a connection from the device 200 to a CDN server 220 is established, a packet processing engine 206 may be configured to identify additional connections within a predetermined time period or window prior to the CDN connection 222 being established. For example, suppose the CDN connection 222 is established at T=0. Additionally, suppose, for example, that the predetermined time period or window prior to the CDN connection is T=−7. Application server 230A was connected to the device 220 through the network interface 204 via the network 210 by application connection 232A at T=−1. Application server 230B was connected to the device 220 through the network interface 204 via the network 210 by application connection 232B at T=−3. Application server 230C was connected to the device 220 through the network interface 204 via the network 210 by application connection 232C at T=−12. Therefore, connections that were established within the predetermined time period or window are application connection 232A and 232B corresponding to application server 230A and 232B, respectively. The application connection 232C to application server 230C was formed outside of the predetermined time period window. For the application connections that were established within the predetermined time period window, a value associated with the application is incremented. In some implementations, classifying the CDN connection 222 as corresponding to the application having the highest of the values associated with the applications occurs.

Figure 3:
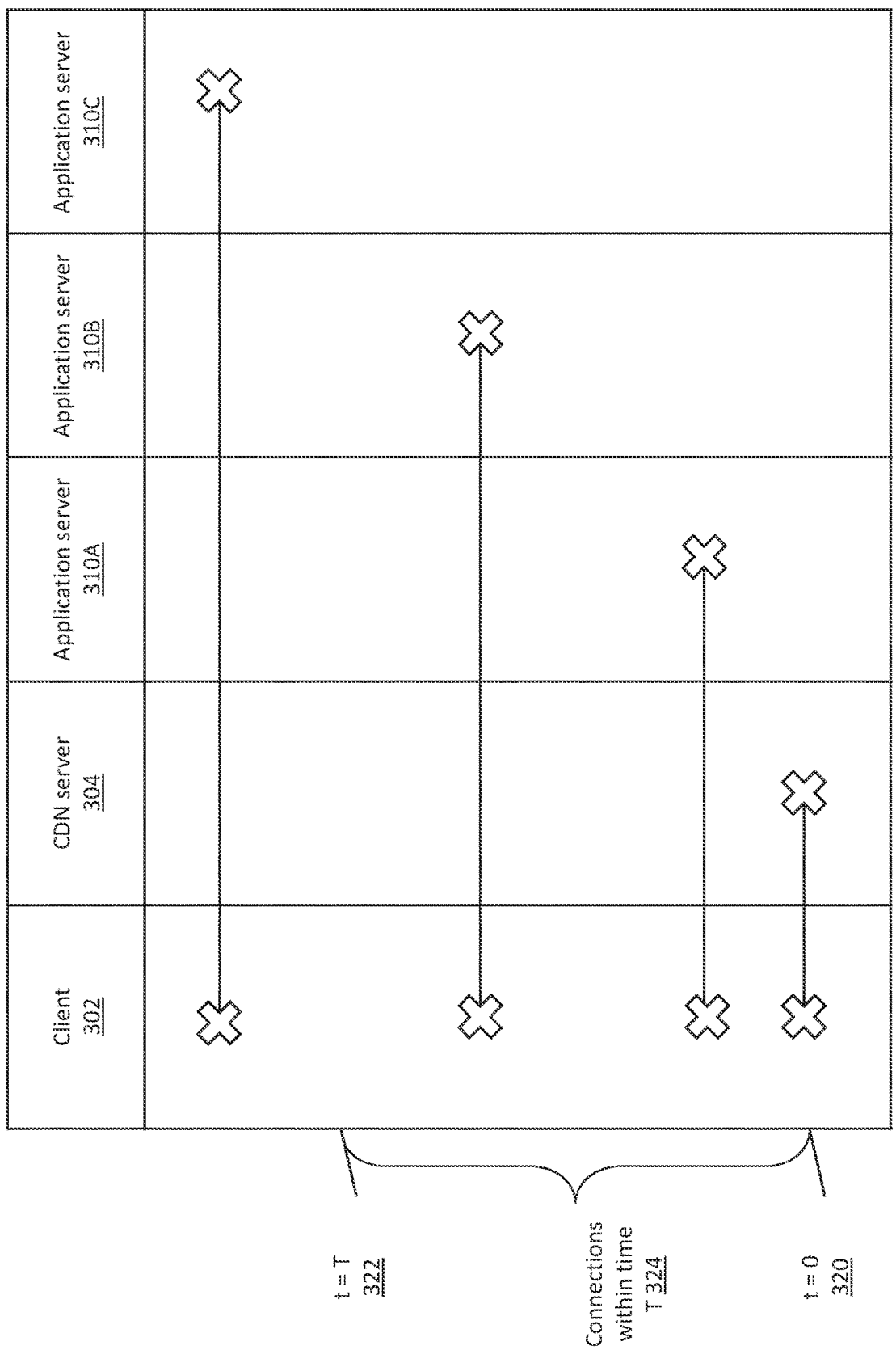
FIG. 3 is a swim-lane diagram illustrating an implementation of a system for classifying a CDN connection using connections established within a predetermined time period.

FIG. 3 is a swim-lane diagram illustrating an implementation of a system for classifying a CDN connection using connections established within a predetermined time period or window. For example, a connection between a client 302 and a CDN server 304 has been established at t=0 320. In this particular example, there are connections prior to t=0 within time T 324 that have been established which include a connection between the client and application server 310B and the client and application server 310C. It will be appreciated that any number of connections between the client and different application servers can be established, including multiple connections from the same application server. The application connection between client 302 and the application server 310C was established outside of the of the predetermined time period window. For the application connections that were established within the predetermined time period window, a value associated with the application is incremented.

As discussed above, the temporal proximity of connections to applications and connections to a CDN server from a client may be used to identify applications that are likely associated with the CDN connection. To further disambiguate these potential candidate applications, the same temporal relationships may be identified in connections of other client devices to the CDN server and application servers. If the same temporal proximity between the CDN connection and a particular application server connection is observed enough times from enough unique users and/or client devices, then it can be deduced that the CDN server is associated with the corresponding application, and the CDN connection may be classified accordingly.

Figure 4:
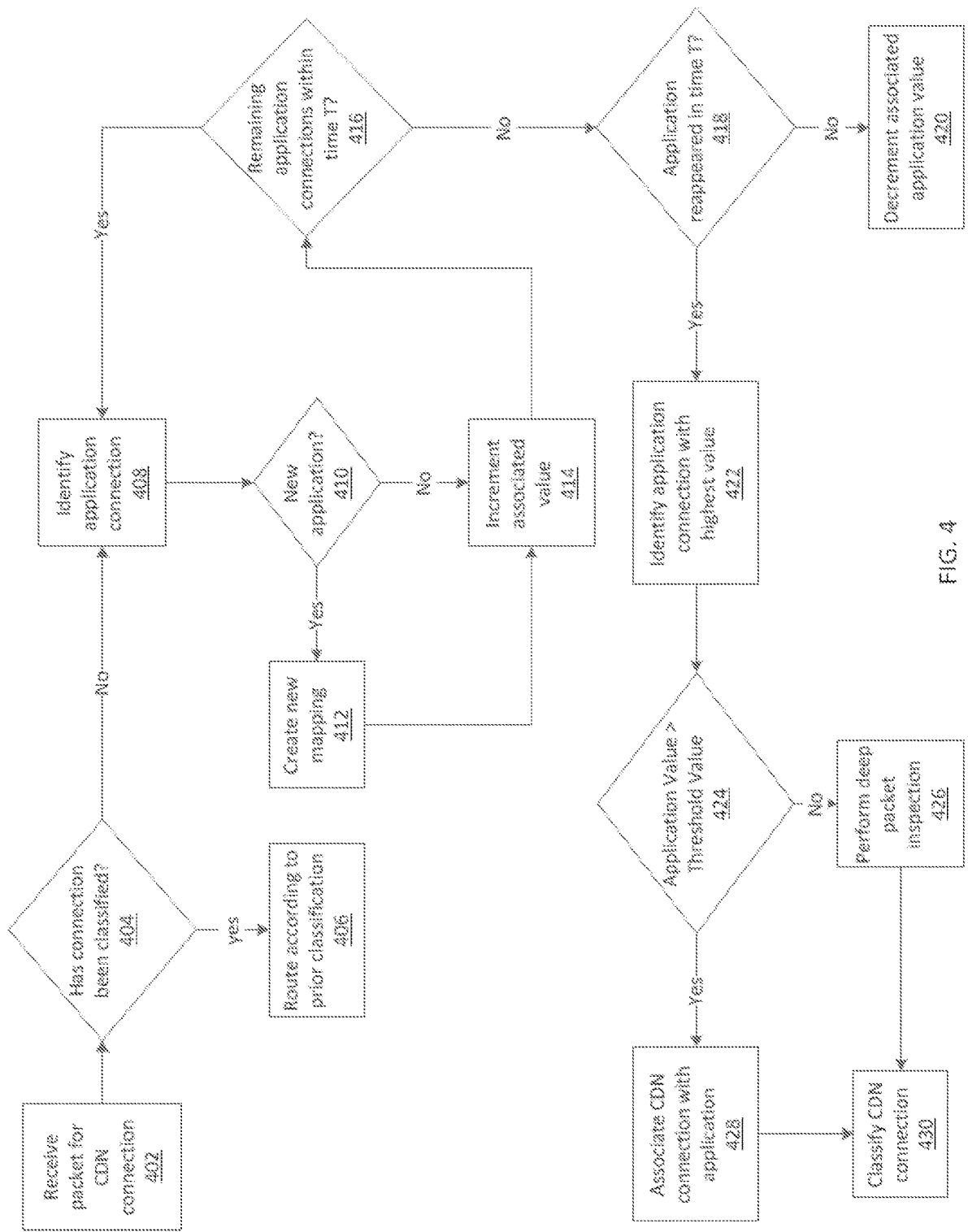
FIG. 4 is a flow chart illustrating an implementation of a method for classifying a CDN connection using connections established within a predetermined time period.

FIG. 4 is a flow chart illustrating an implementation of a method for classifying a CDN connection using connections established within a predetermined time period. At step 402, a packet is received for a CDN connection. In some implementations, a CDN connection is established by a device to a CDN server. The device may be an endpoint of the connection or may be an intermediary of the connection between two endpoints.

At step 404, in some implementations, a packet processing engine of the device may determine if the connection has been classified. For example, in some implementations, the connection established has been previously classified, then the packet may be routed according to the previous classification 406. In some implementations, the connection is classified according to a policy associated with the previously classified connection with an application. In other implementations, the packet processing engine of the device may continue to identifying the application connection 408.

At step 406, the packet is routed according to a prior classification. In some implementations, a prior classification has been performed using a traditional deep packet inspection. In other implementations, a prior classification has been performed through an association of the connection with an application.

At step 408, the packet processing engine of the device may identify the application connection. In some implementations, identifying the application connection involves the process of determining whether the application connection originates from a new application or an application that has already been encountered. In some implementations, determining if the application has been encountered can involve cross-referencing the application in question with a candidate list, which could be a list, collection, database, or mapping of applications that have already been encountered. Applications that have already been encountered enter the candidate list when they are first seen and initially labeled as new applications. One an application has been seen for the first time, it can be added the candidate list of applications that have already been encountered.

At step 410, packet processing engine of the device will resolve the question of whether the application that has been established with the device is new. In some implementations, for an application that is not new, a value associated with the application is incremented. In other implementations, a new mapping is created if the application is new before a value associated with the application is incremented.

At step 412, a new mapping is created for a new application. In some implementations, a new mapping involves creating a key-value database wherein the key is the application and the value associated with the key is formed by incrementing or decrementing the value at various points during the process.

At step 414, a value associated with the application is incremented. In some implementations, the value represents the total number of times a connection has been established with an application and a device in a predetermined time period. In other implementations, the value has also been decremented to represent that the application has not reappeared in a predetermined time period. Therefore, the value is not directly linked to the absolute number of times that a connection has been established between the application and the device in a predetermined time period.

At step 416, the packet processing engine of the device may determine if there are any remaining application connections with the device that have occurred within time T 416. In some implementations, the packet processing engine of the device will return to step 408 to identify the application connection, while in other implementations, the packet processing engine of the device will proceed to determine if the application has reappeared in time T 418. In some implementations, the remaining applications within time T consists of a list of applications that have not yet been identified. The packet processing engine of the device may continue to identify the applications and removing them from the list of applications that have not yet been identified once the application has been identified. In some implementations, when the list of applications that have not yet been identified is an empty set or null, then the packet processing engine of the device may proceed to the next step.

At step 418, the packet processing engine of the device may determine if an application has reappeared in time T. In one implementation, if the application has not reappeared in time T, then the value associated with the application is decremented. In other implementations, the packet processing engine of the device proceeds to the next step once all of the applications that have not appeared in time T have been identified and their associated values decremented.

In step 420, the packet processing engine of the device decrements the value associated with the application. In some implementations, this process involves identifying the application that has not reappeared in time T, using a key-value lookup to identify the value associated with the application key, decrementing the value and storing the updated value. In other implementations, the application may be removed from the previously mentioned candidate list if the value is less than a threshold value.

In step 422, the packet processing engine of the device identifies the application connection with the highest associated value. In some implementations, this process involves identifying the key-value pair with the highest value. This would correspond to the application with the highest number of connections minus number of connections that did not reappear in time T. As discussed above, the associated value may be incremented not just from connections by a single user or device to the corresponding application server and CDN server, but also from other client devices or users. This may be particularly useful in quickly identifying application-CDN correspondences via aggregation of connection data from large numbers of client devices.

In step 424, the packet processing engine of the device may determine if the value associated with the application that was previously identified in step 422 is larger than a threshold value. In some implementations, the value is not larger than the threshold value and a deep packet inspection is performed. In some implementations, the value is larger than the threshold value and the CDN connection can be associated with the application identified in step 422.

In step 426, a deep packet inspection is performed on the packet. A deep packet inspection, though costly in terms of time and resources, may be an option to classify the CDN connection in a scenario where the application value is not greater than the threshold value. In some implementations, the process may classify a CDN connection. In some implementations, the process may classify a CDN connection after performing a deep packet inspection on the first packet.

In step 428, if the value associated with the application from step 424 is greater than the threshold value, then the CDN connection can be associated with the application. In some implementations, the CDN connection corresponds to a first application having a highest value of the values associated with the set of applications within time T and does not have to exceed a threshold value.

In step 430, the CDN connection can be classified according to the association of the CDN connection with the application found in step 428. In some implementations, classifying the CDN connection involves storing information about the CDN connection's associated application in a classification table. In some implementations, the packet processing engine of the device may return to step 402 to receive a packet for classifying a new CDN connection Accordingly, the systems and methods discussed herein provide for classifying CDN connections to the originating application on the first packet. In some implementations, the system identifies application connections established within a predetermined time period prior to the CDN connection and increments a value associated with these connections. The system classifies the CDN connection as corresponding to the application connection with the highest associated value, allowing routing of network traffic to take advantage of QoS benefits and reduce the need for deep packet inspection.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   identifying, by a device, a packet of an unclassified connection to a destination address;
   identifying, by the device, a quantity of previously classified connections established within a time period for each of a plurality of applications accessible via the destination address;
   establishing, by the device, for at least one application of the plurality of applications, a value based at least on the quantity of previously classified connections established for that application within the time period; and
   determining, by the device responsive to the identification of the packet, that the unclassified connection corresponds to the at least one application of the plurality of applications based at least on the established value for that application.

2. The method of claim 1, further comprising receiving, by the device, the packet for the unclassified connection via the network, the network being a content delivery network.

3. The method of claim 1, further comprising identifying, by the device, the plurality of connections prior to a time of the connection.

4. The method of claim 1, further comprising determining, by the device, that the unclassified connection corresponds to the application based at least on the value for the application being both higher than the value of other applications of the plurality of applications and a threshold.

5. The method of claim 1, further comprising establishing, by the device, the value for at least one application by incrementing the value in response to connection of the application within the time period.

6. The method of claim 1, further comprising establishing the value for at least one application by decrementing the value in response absence of a connection to the application within the time period.

7. The method of claim 1, further comprising performing, by the device, one or more network functions on one or more packets of the connection based at least on classification of the connection with the application.

8. A device comprising:
   one or more processors, coupled to memory and configured to:
      identify a packet of an unclassified connection to a destination address;
      identify a quantity of previously classified connections established within a time period for each of a plurality of applications accessible via the destination address;
      establish for at least one application of the plurality of applications, a value based at least on the quantity of previously classified connections established for that application within the time period; and
      determine, responsive to the identification of the packet, that the unclassified connection corresponds to the at least one application of the plurality of applications based at least on the established value for that application.

9. The device of claim 8, wherein the one or more processors are further configured to receive the packet for the connection via the network, the network being a content delivery network.

10. The device of claim 8, wherein the one or more processors are further configured to identify the plurality of connections prior to a time of the connection.

11. The device of claim 8, wherein the one or more processors are further configured to determine that the unclassified connection corresponds to the application based at least on the value for the application being both higher than the value of other applications of the plurality of applications and a threshold.

12. The device of claim 8, wherein the one or more processors are further configured to establish the value for at least one application by incrementing the value in response to connection of the application within the time period.

13. The device of claim 8, wherein the one or more processors are further configured to establish the value for at least one application by decrementing the value in response absence of a connection to the application within the time period.

14. The device of claim 8, wherein the one or more processors are further configured to perform one or more network functions on one or more packets of the connection based at least on classification of the connection with the application.

15. A system comprising:
 a device in communication with a plurality of applications hosted on a remote computing device, wherein the device is configured to:
  establish connections to the plurality of applications;
  identify a quantity of previously classified connections used within a time period to connect to each application of the plurality of applications;
  establish a value for at least one application based at least on the quantity of previously classified connections used within the time period to connect to the at least one application;
  receive a packet for a new connection to the destination; and
  classify the new connection as corresponding to the at least one application of the plurality of applications based at least on the established value for that application.

16. The system of claim 15, wherein the device is further configured to perform one or more network functions on the packet based at least on the classification.

17. The system of claim 15, wherein the device is further configured to determine that the connection corresponds to the application based at least on the value for the at least one application being higher than both the value of other applications of the plurality of applications and a threshold.

18. The device of claim 8, wherein the device is further configured to establish the value for the at least one application by incrementing the value for each of the number of times that the plurality of connections have been used to connect to the at least one application within the time period.

19. The system of claim 15, wherein the device is further configured to decrement the value for at least one application by decrementing the value if the plurality of connections have not been used to connect to the at least one application.

20. The system of claim 15, wherein the device is further configured to connect to the plurality of applications via a content delivery network.

* * * * *